United States Patent
Grabau

(10) Patent No.: US 9,360,128 B2
(45) Date of Patent: Jun. 7, 2016

(54) GRAPHITE/METAL VALVE SEAL ASSEMBLY FOR HIGH TEMPERATURE CONTROL VALVES

(71) Applicant: FISHER CONTROLS INTERNATIONAL LLC, Marshalltown, IA (US)

(72) Inventor: Ted D. Grabau, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 14/208,389

(22) Filed: Mar. 13, 2014

(65) Prior Publication Data

US 2014/0264129 A1    Sep. 18, 2014

Related U.S. Application Data

(60) Provisional application No. 61/782,723, filed on Mar. 14, 2013.

(51) Int. Cl.
    *F16K 25/00*    (2006.01)
    *F16K 3/24*     (2006.01)

(52) U.S. Cl.
    CPC .............. *F16K 25/005* (2013.01); *F16K 3/243* (2013.01)

(58) Field of Classification Search
    CPC ....... F16K 3/267; F16K 3/243; F16K 25/005; F16J 15/56; F16J 9/28; F16J 15/186; F16J 15/3212

USPC ............... 251/324, 332, 368, 214; 137/625.3; 277/530, 539, 541, 589
See application file for complete search history.

(56) References Cited

U.S. PATENT DOCUMENTS

| | | | |
|---|---|---|---|
| 1,988,216 A * | 1/1935 | Ryan | 277/530 |
| 3,352,316 A | 11/1967 | Zahn | |
| 4,507,521 A * | 3/1985 | Goellner | 174/151 |
| 4,744,572 A | 5/1988 | Sahba et al. | |
| 6,250,604 B1 | 6/2001 | Robert | |

(Continued)

FOREIGN PATENT DOCUMENTS

| | | |
|---|---|---|
| DE | 851153 C | 10/1952 |
| EP | 0 308 390 A1 | 3/1989 |
| EP | 675304 A1 | 10/1995 |

(Continued)

OTHER PUBLICATIONS

Search Report for PCT/US2014/026005, mailed Jun. 27, 2014.

(Continued)

*Primary Examiner* — Marina Tietjen
(74) *Attorney, Agent, or Firm* — Marshall, Gerstein & Borun LLP

(57) ABSTRACT

A sliding stem control valve includes a valve body, a seat ring located within the valve body and a valve plug slidably mounted within the valve body, the valve plug and the valve seat cooperating to control fluid flow through the control valve. A seal assembly is located between the valve plug and the valve seat, the seal assembly including a metal/graphite seal ring located between a first backup ring and a second backup ring. A biasing element is located adjacent the second backup ring and a retainer ring is located adjacent the biasing element to maintain the biasing element adjacent the second backup ring.

16 Claims, 2 Drawing Sheets

(56) References Cited

U.S. PATENT DOCUMENTS 7,963,502 B2 * 6/2011 Lovell et al. .................. 251/214
2010/0270491 A1 10/2010 Faas

FOREIGN PATENT DOCUMENTS

| GB | 110983 A | * | 11/1917 | ................. | F16J 9/28 |
| GB | 278522 A | * | 10/1927 | ............... | F16J 15/20 |
| GB | 344123 A | * | 3/1931 | ............... | F16J 15/26 |
| GB | 1413697 A | | 11/1975 | | |
| JP | 2001349439 A | * | 12/2001 | | |
| JP | 2002039395 A | * | 2/2002 | | |

OTHER PUBLICATIONS

Written Opinion for PCT/US2014/026005, mailed Jun. 27, 2014.
International Preliminary Report on Patentability for International application No. PCT/US2014/026005, dated Sep. 15, 2015.

* cited by examiner

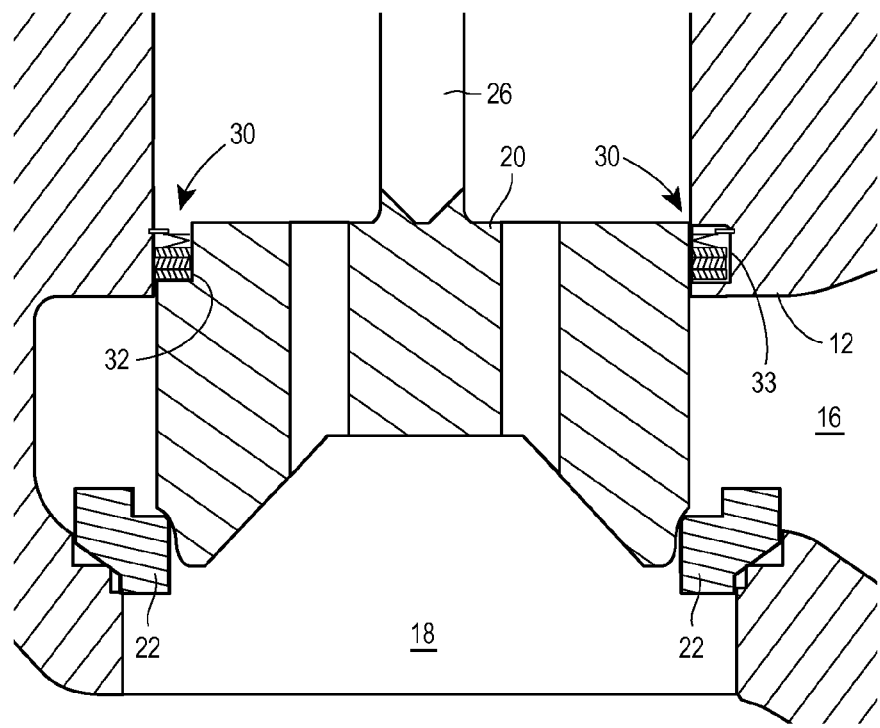
FIG. 2
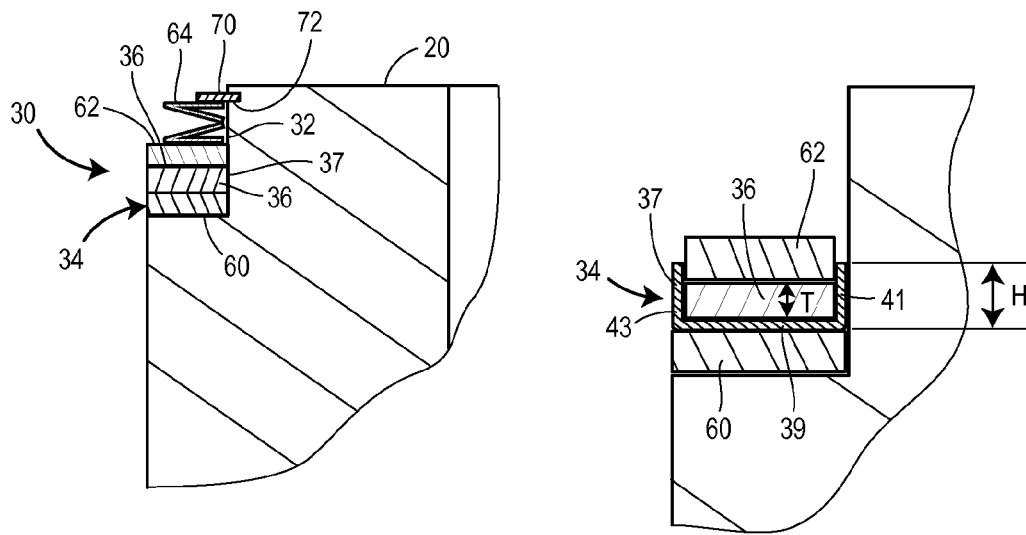
FIG. 3  FIG. 4

GRAPHITE/METAL VALVE SEAL ASSEMBLY FOR HIGH TEMPERATURE CONTROL VALVES

FIELD OF THE DISCLOSURE

The disclosure relates to process control valves, such as sliding stem valves, and more particularly to sliding stem control valves having a graphite/metal seal assembly for high temperature operations.

BACKGROUND

Process control valves are used in systems or processes that require regulation or control of process fluid flows. Such control valves may be configured as sliding stem valves, rotary valves, globe valves, etc. By setting a position of a control element, such as a valve plug, relative to a valve seat, fluid flow through the control valve may be precisely set. The valve plug slides or moves relative to the valve seat generally within a valve body. In some control valves, a cage may be included, the valve plug sliding within the cage. Because the valve plug slides within the valve body, preventing fluid flow between the valve plug and the valve body (or cage) is important. At the same time, reducing friction and minimizing wear and adhesion between the valve plug and the valve body (or cage) is desirable.

In some control valves, a seal may be incorporated into valve plug itself, or the seal may be incorporated into the valve body (or cage) or bonnet. Regardless, the seal must prevent fluid from flowing between the valve plug and the valve body or bonnet. In an effort to both prevent fluid from flowing between the control element and the valve body or bonnet, and to reduce friction generated between the control element and valve body or bonnet, some sliding stem valves have incorporated relatively soft materials into the seal. Such seals are spring loaded, pressure assisted lip seals constructed from neat, filled, or reinforced polytetrafluoroethylene jackets with a corrosion resistant spring constructed from stainless steel, nickel or cobalt based alloys. Other fluoropolymers, ultrahigh molecular polyethylene, and polyurethane are other jacket materials that are used. Other types of seals that have been used include synthetic o-rings, quad-rings, backup rings with PTFE based wear rings and metal reinforced PTFE based monolithic seals. While reducing friction and providing a high quality, resilient seal, soft materials are generally not useful in high temperature environments because the material may melt, creep, or otherwise degrade under high temperature conditions. All of these soft materials are only used for relatively low temperatures, less than 600° F. (less than about 316° C.).

Conventional high temperature sliding stem control valves have typically incorporated monolithic, hard graphite seal rings that can withstand high temperatures. While the graphite seal rings are able to withstand high temperatures, the graphite seal rings do not generally provide an optimum seal between the valve plug and the valve body (or cage) or bonnet because they are not flexible, compliant, or resilient. Graphite seal rings may be damaged from friction created between the valve plug and the valve body (or cage) and they are relatively vulnerable to particles and contaminants in the flow stream particles or contaminants that have adhered to the valve plug or valve body (or cage). The lack of compliance in monolithic graphite materials results in significantly more shutoff leakage than the softer rubber or plastic compliant materials that are employed in low temperature environments. Additionally, graphite seal rings have relatively high coefficients of friction, which leads to excess friction and wear when the valve plug is moved. This excess friction and wear leads to degradation and early failure of the seal and/or the control element.

SUMMARY OF THE DISCLOSURE

A sliding stem control valve includes a valve body having an inlet and an outlet. The inlet and outlet are fluidly connected by a fluid flow passageway. A valve seat is located in the fluid flow passageway. A slidable control element cooperates with the valve seat to control fluid flow through the valve body. A seal assembly is located between the control element and the valve body. The seal assembly includes a metal/flexible graphite seal ring located between a first backup ring and a second backup ring. A biasing element is located adjacent one of the backup rings and a retainer ring maintains the biasing element adjacent the backup ring so that force generated by the biasing element is transferred to the backup ring and thus to the metal/flexible graphite sealing ring.

In another embodiment, a seal assembly for a high temperature sliding stem control valve includes a metal/graphite seal ring that is located between a first backup ring and a second backup ring. A biasing element is located adjacent the second backup ring and a retainer ring is located adjacent the biasing element. The metal/graphite seal ring may include a flexible graphite ring surrounded on at least three sides by a thin metal envelope.

In yet another embodiment, the seal assembly may be located in an annular recess formed in the control member.

In yet another embodiment, the seal assembly may be located in an annular recess formed in the valve body.

The disclosed seal assembly provides superior sealing capabilities in high temperature environments while reducing or minimizing friction between the control member and the valve housing.

BRIEF DESCRIPTION OF THE DRAWINGS

FIG. 3 is a close up cross-sectional view of a portion of the control element including the metal/graphite seal assembly.

FIG. 4 is a further close up cross-sectional view of the metal/graphite seal assembly of FIG. 3.

Figure 1:
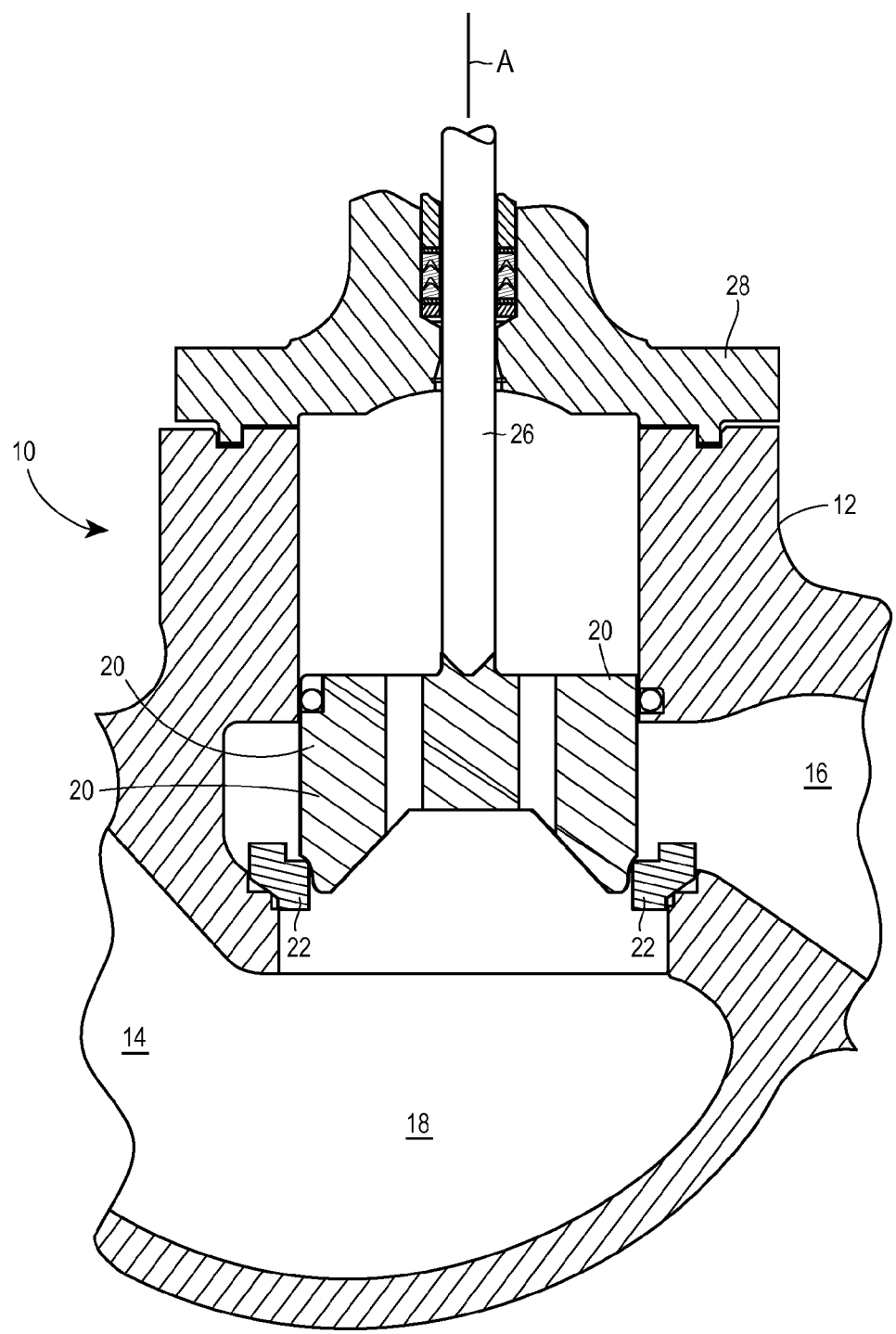
FIG. 1 is a cross-sectional view of sliding stem control valve constructed in accordance with the teachings of the disclosure FIG. 2 close up cross-sectional view of the control element of the sliding stem control valve of FIG. 1, including a metal/graphite seal assembly.

While the disclosure is susceptible to various modifications and alternative constructions, certain illustrative embodiments of the metal/graphite seal assembly have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION

For purposes of the following discussion, terms such as inwardly, outwardly, radially inwardly or radially outwardly are used to indicate relative position with respect to a center axis A of a valve stem. Similarly, terms such as upper, lower, upwardly, or downwardly are used to indicate relative orientation when the control valve is positioned as shown in the drawings.

Referring now to the drawings, FIG. 1 illustrates a sliding stem control valve 10 assembled in accordance with the teachings of the disclosed example of the present invention and having a valve body 12, a fluid inlet 14, a fluid outlet 16, and a passageway 18 connecting the fluid inlet 14 and the fluid outlet 16. While the control valve is illustrated in FIG. 1 as a sliding stem valve, the teachings of this disclosure may be applied to other types of control valves as well, such as rotary valves, ball valves, globe valves, etc. A control member, such as a valve plug 20, is slidably mounted within the valve body 12 and shiftable between a closed position (as shown in FIG. 1), which prevents fluid flow through the valve body 12, and an open position (not shown), which allows fluid flow through the valve body 12. In the example of FIG. 1, the valve plug 20 is a balanced valve plug. In other embodiments, the valve plug 20 may be unbalanced. The valve 10 includes a seat ring 22, which cooperates with the valve plug 20 to control fluid flow through the valve body 12. The control valve 10 also includes a valve stem 26 coupled to the valve plug 20 and extending through a bonnet 28. The valve stem 26 extends along an axis A and is connected to a valve actuator (not shown) for moving the valve plug 20 between the closed position shown in which the valve plug 20 is in contact with the seat ring 22, thereby preventing fluid flow through the passageway 18 and an open position in which the valve plug 20 is spaced away from the seat ring 22, thereby allowing fluid to flow through the passageway 18.

Referring now to FIGS. 2-4, a valve seal assembly 30 is located in an annular recess 32 formed in the valve plug 20, as illustrated on the left side of FIG. 2. Alternatively, the seal assembly 30 may be located in an annular recess 33 formed in the valve body 12, as illustrated on the right side of FIG. 2. Regardless, the seal assembly 30 may include a metal/graphite seal ring 34. In one embodiment, the metal/graphite seal ring 34 may include a graphite ring 36 seated within a metal envelope 37. The metal envelope 37 may be formed from a thin metal foil having a thickness in the range of about 0.001 in to about 0.005 in. In one preferred embodiment, the metal foil comprises a durable metal alloy such as N07718 or N07750, for example. The metal envelope 37 protects the graphite ring 36 from frictional damage during reciprocation of the valve plug 20. The metal envelope 37 may also reduce friction between the valve plug 20 and the valve body 12. For example, in other embodiments the metal foil may be coated with a silver plating, or the metal foil may comprise slightly softer metals, such as aluminum, copper, or bronze. As illustrated in FIG. 4, the graphite ring 36 fits within the metal envelope 37, the metal envelope 37 surrounding the graphite ring 36 on three sides (as illustrated in cross-section in FIG. 4), while a fourth side (i.e., the upper side as illustrated in FIG. 4) remains open. The metal envelope 37 generally has a "U" shape in cross section including a bottom side 39, and inner side wall 41, and an outer side wall 43. The inner side wall 41 and the outer side wall 43 extend upward substantially perpendicular to the bottom side 39. The inner side wall 41 and the outer side wall 43 have heights H that are greater than a thickness T of the graphite ring 36. In other words, the inner side wall 41 and the outer side wall 43 extend above (as illustrated in FIG. 4) the graphite ring 36.

The metal/graphite seal ring 34 may be located between a first backup ring 60 and a second backup ring 62. The first and second backup rings 60, 62 may be formed of any hardenable material, such as S41600 stainless steel, for example. The first and second backup rings 60, 62 maintain proper positioning of the metal/graphite seal ring 34 within the annular recess 32 (or the annular recess 33) as well as providing anti-extrusion protection for the metal/graphite seal ring 34. The first and second backup rings 60, 62 also protect the metal/graphite seal ring 34 from environmental factors, such as excessive heat and pressure. In the embodiment illustrated in FIGS. 1-4, the second backup ring 62 is positioned at least partially within the metal envelope 37. As a result, the second backup ring 62 has a smaller radial dimension than the first backup ring 60.

A biasing element 64, such as a Belleville spring, a spiral wound gasket, or a bolted cap, for example, may be located adjacent the second backup ring 62. The biasing element 64 applies axial force to the second backup ring 62, which is transferred to the graphite ring 36. This axial force causes the graphite ring 36 to expand radially outward as the graphite ring 36 is compressed between the first backup ring 60 and the second backup ring 62. As the graphite ring 36 expands radially outward, the graphite ring 36 pushes the metal envelope 37 against the valve body 12, which produces an excellent fluid seal between the seal assembly 30 and the valve body 12. A retainer ring 70 retains the biasing element 64 in position against the second backup ring 62. The retainer ring 70 may be at least partially located in an annular slot 72 formed in the control element 20. Alternatively, the retainer ring may be at least partially located in an annular slot in the valve body 12. The retainer ring 70 prevents the biasing element 64 from becoming separated from the second backup ring 62.

In accordance with one or more of the disclosed examples, a seal assembly is provided that provides superior sealing capability, while reducing friction between a control member and a valve body, for high temperature control valves. By enveloping a graphite ring at least partially within a metal envelope, the graphite seal ring is protected from friction and environmental factors while providing an excellent fluid seal.

The foregoing detailed description has been given for clearness of understanding only and no unnecessary limitations should be understood therefrom, as modifications will be obvious to those skilled in the art.

The invention claimed is:

1. A sliding stem control valve comprising:
   a valve body having an inlet and an outlet fluidly connected through a passageway;
   a seat ring mounted in the passageway,
   a control element slidably disposed within the valve body, the control element and the valve seat cooperating to control fluid flow through the valve body; and
   a seal assembly having a metal/graphite seal ring located between a first backup ring and a second backup ring, a biasing element located adjacent the second backup ring, and a retainer ring holding the biasing element adjacent to the second backup ring,
   wherein the metal/graphite seal ring includes a graphite ring and a metal envelope at least partially surrounding the graphite ring, the metal envelope including a bottom side, an inner side wall and an outer side wall, and the second backup ring is at least partially disposed within the metal envelope.

2. The sliding stem control valve of claim 1, wherein the metal envelope surrounds the graphite ring on three sides.

3. The sliding stem control valve of claim 2, wherein metal envelope has a thickness of between about 0.001 in and about 0.005 in.

4. The sliding stem control valve of claim 1, wherein the inner side wall and the outer side wall extend upward substantially perpendicular to the bottom side forming a "U" shape.

5. The sliding stem control valve of claim 4, wherein the inner side wall and the outer side wall each have a height that is greater than a thickness of the graphite ring.

6. The sliding stem control valve of claim 1, wherein the second backup ring has a smaller radial dimension than the first backup ring.

7. The sliding stem control valve of claim 1, wherein the metal envelope is formed from one of N07718, N07750, aluminum, copper, and bronze.

8. The sliding stem control valve of claim 1, wherein the metal envelope is coated with silver plating.

9. A seal assembly for a high temperature control valve, the seal assembly comprising:
   a metal/graphite seal ring located between a first backup ring and a second backup ring;
   a biasing element located adjacent to the second backup ring; and
   a retainer ring holding the biasing element against the second backup ring,
   wherein the metal/graphite seal ring includes a graphite ring and a metal envelope at least partially surrounding the graphite ring, the metal envelope including a bottom side, an inner side wall and an outer side wall, and the second backup ring is at least partially disposed within the metal envelope.

10. The seal assembly of claim 9, wherein the metal envelope surrounds the graphite ring on three sides.

11. The seal assembly of claim 10, wherein metal envelope has a thickness of between about 0.001 in and about 0.005 in.

12. The seal assembly of claim 11, wherein the inner side wall and the outer side wall extending upward substantially perpendicular to the bottom side forming a "U" shape.

13. The seal assembly of claim 12, wherein the inner side wall and the outer side wall each have a height that is greater than a thickness of the graphite ring.

14. The seal assembly of claim 9, wherein the second backup ring has a smaller radial dimension than the first backup ring.

15. The seal assembly of claim 9, wherein the metal envelope is formed from one of N07718, N07750, aluminum, copper, and bronze.

16. The seal assembly of claim 9, wherein the metal envelope is coated with silver plating.

\* \* \* \* \*